(12) United States Patent (10) Patent No.: US 8,653,721 B2
Liu et al. (45) Date of Patent: Feb. 18, 2014

(54) APPARATUS FOR PROVIDING HAPTIC FEEDBACK

(75) Inventors: Lin Liu, Shenzhen (CN); Jie He, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 133 days.

(21) Appl. No.: 13/325,541

(22) Filed: Dec. 14, 2011

(65) Prior Publication Data

US 2012/0299448 A1 Nov. 29, 2012

(30) Foreign Application Priority Data

May 23, 2011 (CN) ...................... 2011 2 0165471 U

(51) Int. Cl.
*H01L 41/08* (2006.01)

(52) U.S. Cl.
USPC ............................................ 310/339; 310/321

(58) Field of Classification Search
USPC .......................................... 310/329, 339, 321
See application file for complete search history.

(56) References Cited

U.S. PATENT DOCUMENTS 7,872,397 B2 * 1/2011 Clingman et al. ............ 310/328

\* cited by examiner

*Primary Examiner* — Mark Budd
(74) *Attorney, Agent, or Firm* — Anova Law Group, PLLC

(57) ABSTRACT

Disclosed is an apparatus used in an electronic device for providing haptic feedback. The apparatus includes a main board defining a mounting surface, a vibration unit mounted on the mounting surface of the main board, the vibration unit being capable of vibrating along a direction parallel to the mounting surface and defining at least two fastening portions at two distal ends thereof. At least two screws are provided to fix the vibration unit on the main board through the fastening portions along a direction perpendicular to the mounting surface.

14 Claims, 4 Drawing Sheets

APPARATUS FOR PROVIDING HAPTIC FEEDBACK

BACKGROUND OF THE INVENTION

1. Field of the Invention

The present invention generally relates to apparatuses for providing haptic feedbacks.

2. Description of Related Art

As disclosed in U.S. Pat. No. 7,535,454 B2, portable electronic devices, such as mobile phones, portable GPS navigations, laptop computers, generally have a number of buttons that allow a user to interface with the devices by inputting information. The capabilities of these devices are increasing while the size and weight are decreasing to enhance portability. For example, mobile phones, in addition to their traditional role as voice-communication devices, now include functions traditionally associated with other devices, such as electronic games, PDAs, and digital cameras.

To permit effective interaction with the handheld devices, the handheld devices typically provide visual and aural cues or feedback. In addition to conventional visual and aural feedback, some of these devices attempt to enhance the effectiveness of device feedback by providing tactile cues or feedback. Some devices utilize structural tactile methods. One such example is to provide raised surfaces on the input surface, e.g., a keypad, of the device. Such methods, however, are inherently static and thus cannot offer effective tactile feedback.

Active methods of providing tactile feedback include incorporating a vibrator into the handheld electronic devices. Such a method of providing haptic cues, however, generally vibrates the entire device. Such method or apparatuses are disclosed in U.S. Pat. No. 7,535,454 B2, U.S. Pat. No. 7,148,875 B2, U.S. Pat. No. 6,853,965 B2, U.S. Pat. No. 6,429,846 B2, U.S. Pat. No. 6,405,158 B2.

DETAILED DESCRIPTION

Reference will now be made to describe the exemplary embodiment of the present disclosure in detail.

The present disclosure is presented for providing the user with intensive interaction experience. For example, if a user taps on a touch screen of a portable gaming, the user will get a tactile feedback, such as vibration, from the touch screen.

Figure 1:
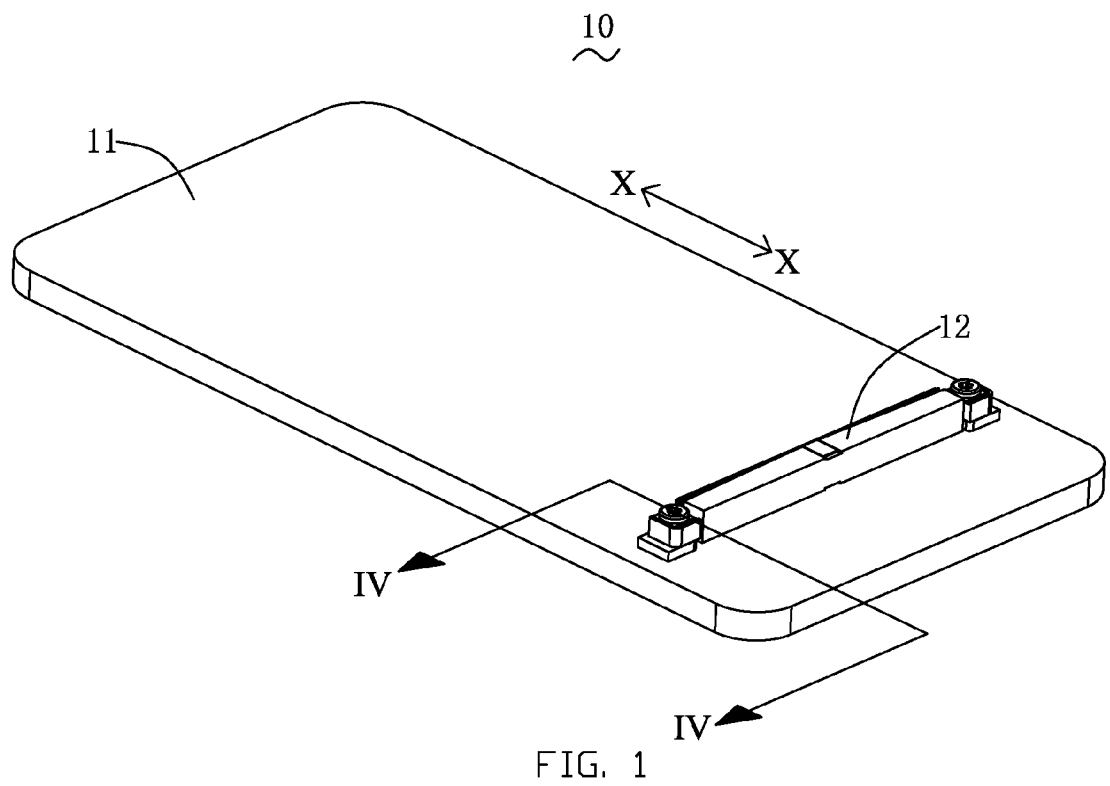
FIG. 1 is an isometric view of an apparatus for providing haptic feedback in accordance with an exemplary embodiment of the present invention.
Figure 2:
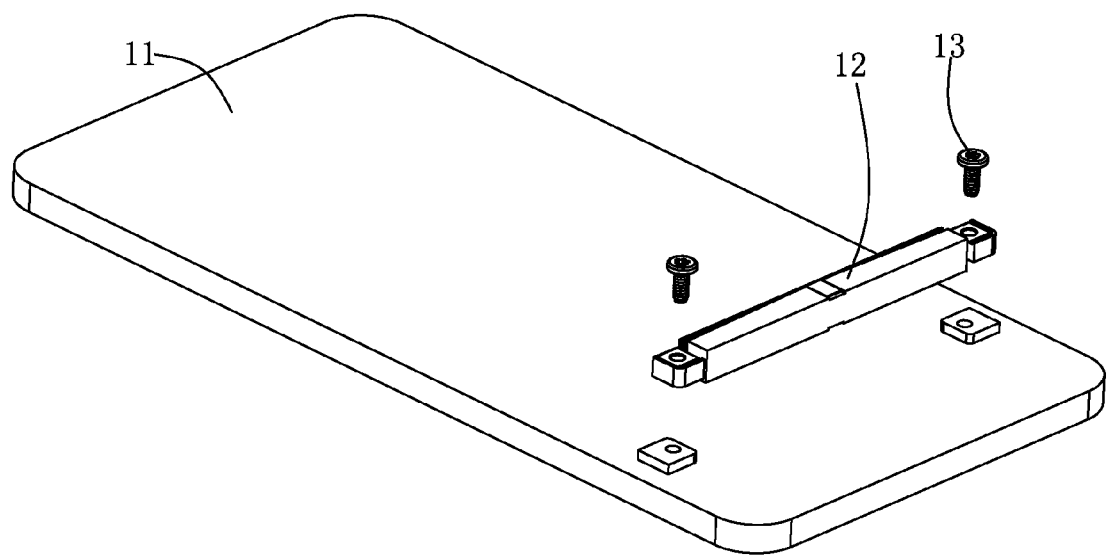
FIG. 2 is an isometric view of the apparatus for providing haptic feedback, showing a vibration unit thereof ready to be mounted to a main board.

Referring to FIGS. 1-2, an apparatus 10 for providing haptic feedback includes a main board 11, and a vibration unit 12 mounted on a mounting surface of the main board 11. The vibration unit 12 may be mounted on selected position of the main board 11 according to factual requirement. In the exemplary embodiment, the vibration unit 12 is mounted on a part adjacent to the edge of the main board 11. The vibration unit 12 is capable of vibrating along a direction X-X parallel to a top surface of the main board 11 where the vibration unit 12 is mounted on. The main board 11 is a component used in an electronic device, such as a mobile phone, a portable gaming device, etc. The main board 11 may be a displaying screen, or a printed circuit board, or a housing of the electronic device. In fact, the main board 11 is a carrier for assembling the vibration unit 12 with the electronic device.

In the exemplary embodiment, the vibration unit 12 is mounted and fixed on the main board 11 by a pair of screws 13 cooperating with two ends of the vibration unit 12. In alternative embodiments, the vibration unit 12 can also be mounted on the main board 11 by adhesive or other connecting means. When the vibration unit 12 vibrates, the main board 11 transmits the tactile vibration to the electronic device for providing haptic feedback to the user who is operating the electronic device.

Figure 3:
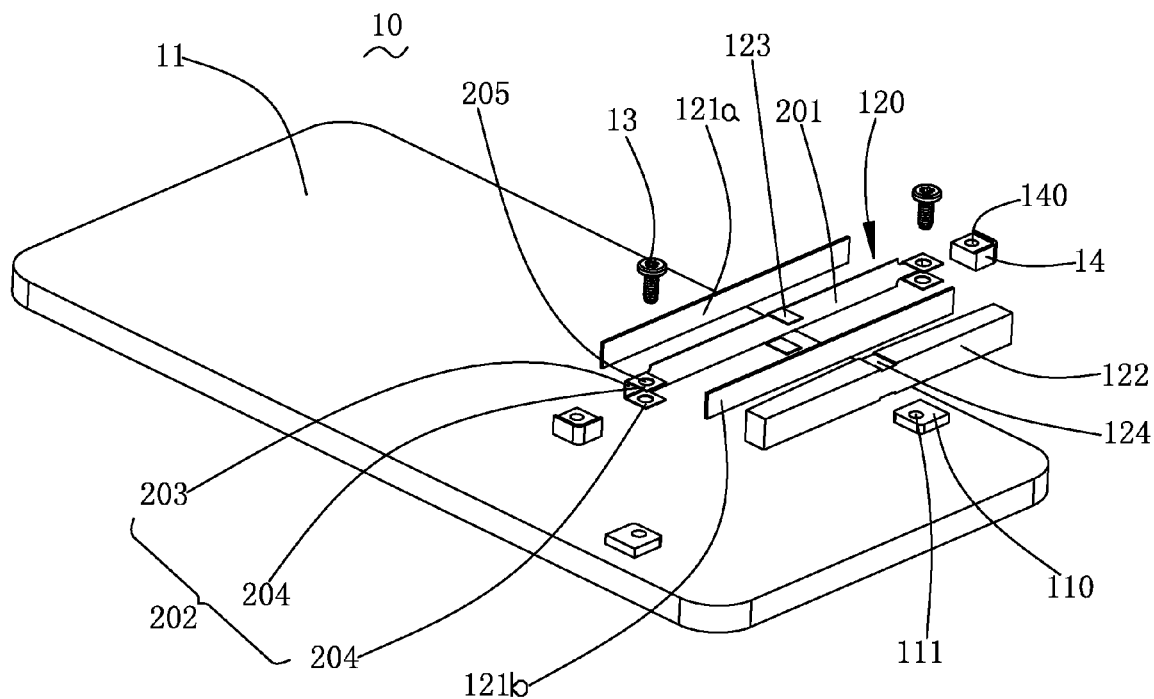
FIG. 3 is an exploded view of the apparatus in FIG. 1.

Referring to FIG. 3 which is an exploded view of the apparatus 10 of the exemplary embodiment of the present disclosure showing components included therein, the main board 1 defines a pair of protrusions 110 extending from the top surface thereof. Each of the protrusions 110 defines a board hole 111 with screw threads on inner sides of the board hole 111. The vibration unit 12 includes a substrate 120, a first piezoelectric layer 121b attached to a side of the substrate 120, a second piezoelectric layer 121a attached to another side of the substrate 120, and a mass 122 attached to one of the piezoelectric layers 121a, 121b. Each of the substrate 120, the piezoelectric layers, and the mass is substantially perpendicular to the mounting surface of the main board 11. Two piezoelectric layers 121a, 121b are used to enhance the vibration of the vibration unit 12. In fact, only one piezoelectric layer can also vibrate.

The substrate 120 further comprises a main body 201, and a pair of fastening portion 202 extending from two ends thereof. Each of the fastening portions 202 includes an extending portion 203 parallel extending from the main body 201 of the substrate 120, and a pair of positioning portions 204 extending perpendicularly from the extending portion 203. The combination of the extending portion 203 and the positioning portions 204 forms a slot. Each of the positioning portions 204 defines a substrate hole 205.

For firmly positioning the mass 122, the substrate 120 further defines a pair of wings 123 extending perpendicularly from the main body 201, and accordingly, the mass 122 defines a pair of notches 124. While assembled, the wings 123 are accommodated in the notches 124.

The vibration unit 12 further comprises a supporting block 14 at least partially received in the slot formed by the combination of the extending portion 203 and the positioning portions 204. The supporting block 14 defines a through hole 140. When received in the slot, the through hole 140 is aligned with the substrate hole 205.

Figure 4:
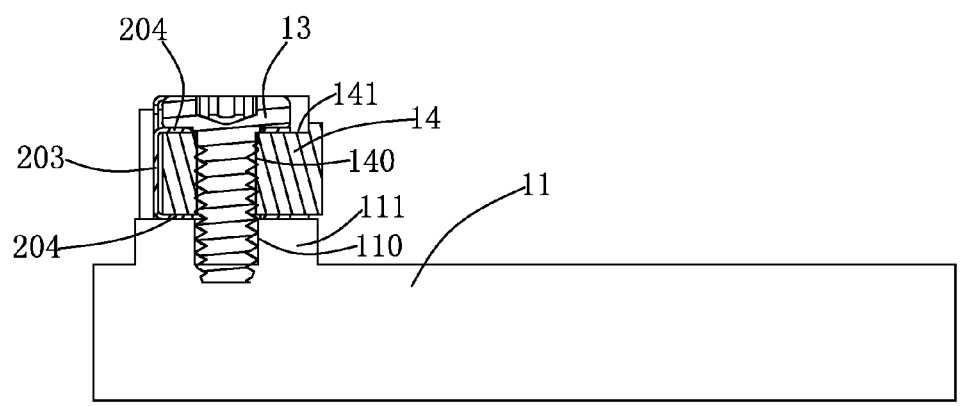
FIG. 4 is a cross-sectional view of the apparatus taken along Line IV-IV in FIG. 1.

Referring to FIG. 4 together with FIG. 3, when assembled with the main board 11, the vibration unit 12 is mounted on the main board 11 by the screws 13 through the substrate holes 205 in the positioning portions 204, the through holes 140 of the supporting blocks 14, and the board holes 111 of the protrusion 110 of the main board 11. As the supporting block 14 is received in the slot formed by the two opposed positioning portions 204 and the extending portion 203, the cooperation between the screw 13 and the fastening portion 202 is stable and reliable. As shown in FIG. 3, the screws 13 fix the vibration unit 12 on the main board 11 along a direction perpendicular to the main board 11, which makes the assembling process much easier.

Figure 5:
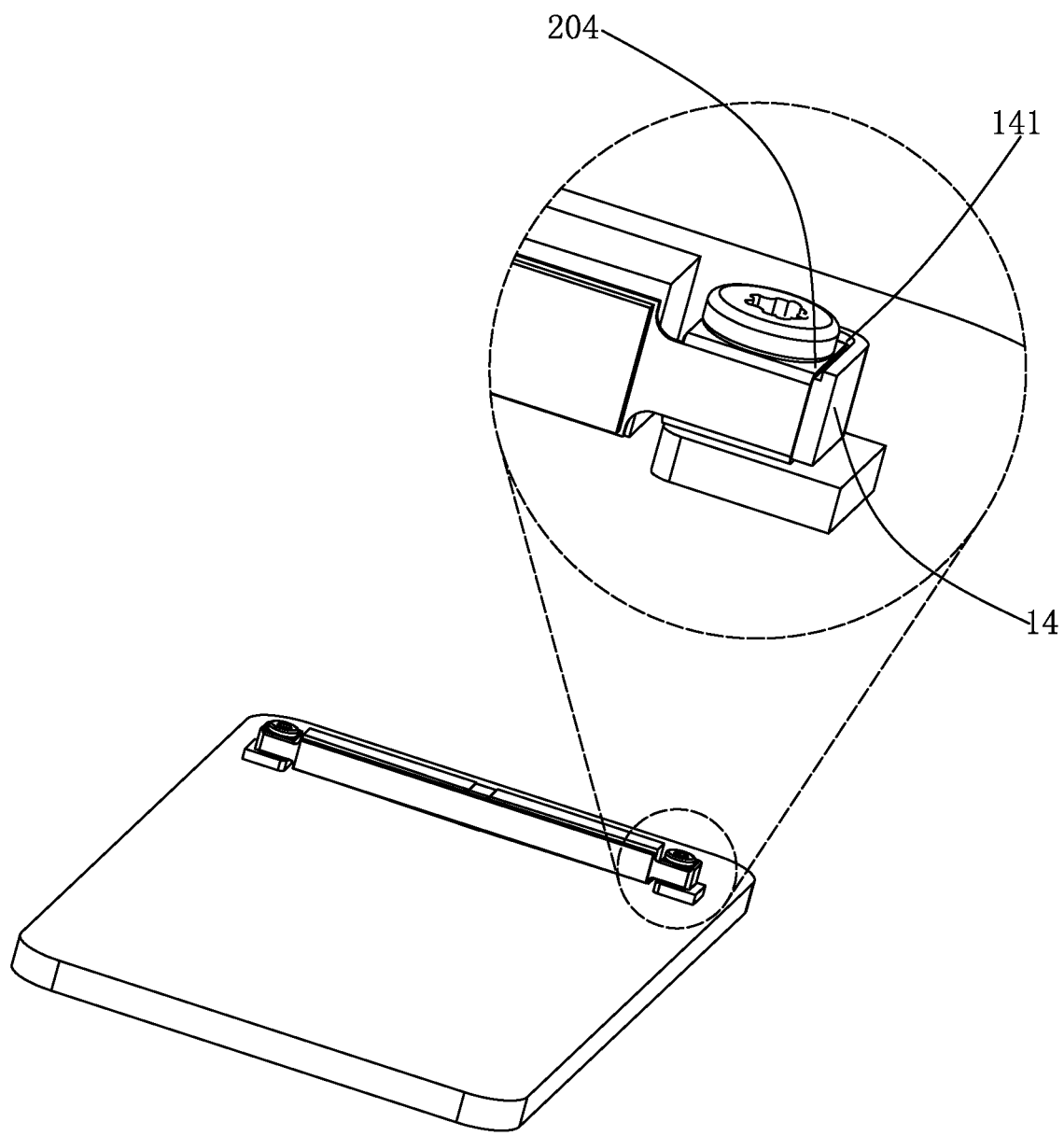
FIG. 5 is an isometric view of the apparatus for providing haptic feedback, from another aspect and with an enlarged area thereof.

Referring to FIGS. 4 and 5, the supporting block 14 defines a recess 141 and the positioning portion 204 is at least partially received in the recess 141, which restricts the position of the supporting block 14 and makes it easy to align the through hole of the supporting block 14 and the substrate hole 205 of the positioning portion 204.

Figure 6:
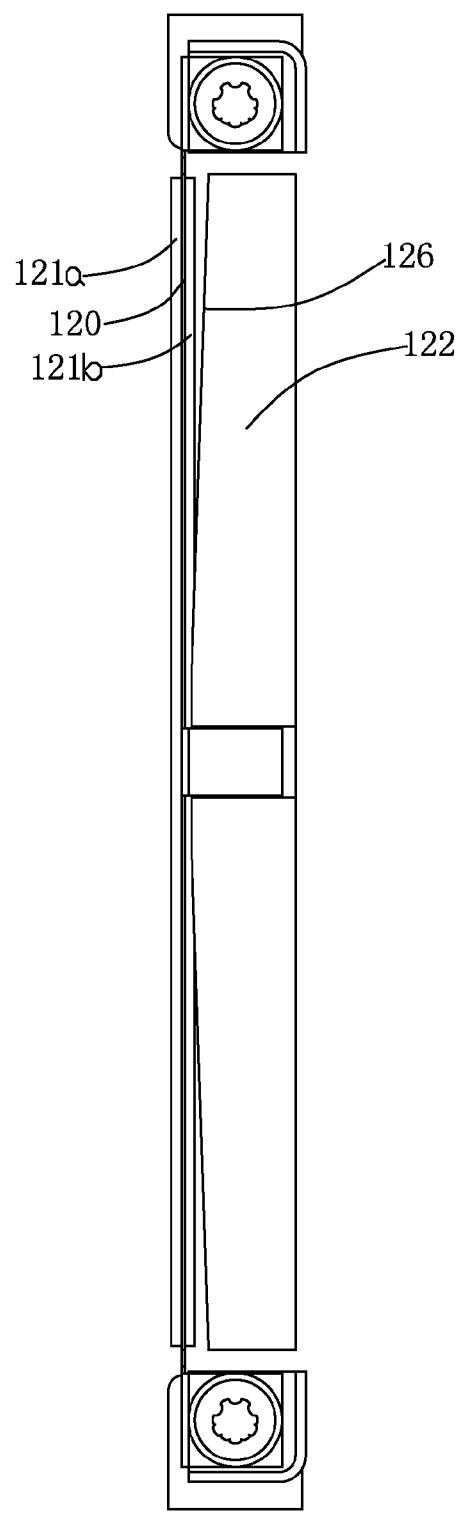
FIG. 6 is a top view of the vibration unit.

Referring to FIG. 6, while assembled, the first piezoelectric layer 121b and the second piezoelectric layer 121a are respectively attached to the sides of the substrate 120, and the mass 122 is attached to one of the two piezoelectric layers, for example, the first piezoelectric layer 121b. The mass 122 defines a side surface 126 adjacent to the first piezoelectric layer 121b. Along a direction from a portion adjacent to the center of the mass 122 toward the distal end of the mass 122, a distance between the first piezoelectric layer 121b and the side surface 126 gradually increases, which provides the piezoelectric layer with more vibrating amplitude. Another word, the mass 122 connects to the first piezoelectric layer 121b with a middle portion of the side surface 126 attached to the side of the first piezoelectric layer 121b.

In the present disclosure, the vibration unit is mounted and fixed to the main board by screws along a direction perpendicular to the main board which enables the operator to assemble the vibration unit to the main board mush easier. The protrusion defined on the main board keeps the vibration unit a distance from the main board for providing the vibration unit with sufficient space to vibrate. Further, the protrusion avoids the vibration unit from scraping the main board. The supporting block enhances the cooperation between the screw and the fastening portion of the vibrating unit.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An apparatus for providing haptic feedback, comprising:
   a main board defining a mounting surface;
   a vibration unit mounted on the mounting surface of the main board, the vibration unit being capable of vibrating along a direction parallel to the mounting surface and defining at least two fastening portions at two distal ends thereof;
   at least two screws fixing the vibration unit on the main board through the fastening portions along a direction perpendicular to the mounting surface;
   wherein the vibration unit further comprises a substrate defining a main body, a first piezoelectric layer attached to one side of the main body, and a mass attached to the first piezoelectric layer, each of the main body of the substrate, the piezoelectric layer, and the mass being substantially perpendicular to the mounting surface of the main board; and wherein
   the substrate further comprises a wing extending perpendicularly from the main body, and the mass further defines a notch for at least partially receiving the wing.

2. The apparatus for providing haptic feedback as described in claim 1 further comprising a second piezoelectric layer attached to another side of the main body of the substrate.

3. The apparatus for providing haptic feedback as described in claim 1, wherein the fastening portion of the vibration unit extends from the main body of the substrate, and further defines a pair of positioning portions both perpendicular to the main body of the substrate, and an extending portion connecting the positioning portions, each of the positioning portions being provided with a substrate hole for cooperating with the screw.

4. The apparatus for providing haptic feedback as described in claim 3 further comprising a supporting block received in the slot of the fastening portion and defining a through hole for cooperating with the screw.

5. The apparatus for providing haptic feedback as described in claim 4, wherein the supporting block further defines a recess for at least partially receiving the positioning portion of the fastening portion.

6. The apparatus for providing haptic feedback as described in claim 1, wherein the main board further comprises a protrusion with a board hole therein for cooperating with the screw and for keeping the vibration unit a distance from the mounting surface of the main board.

7. The apparatus for providing haptic feedback as described in claim 1, wherein the mass defines a side surface adjacent to the first piezoelectric layer, along a direction from a portion adjacent to the center of the mass toward the distal end of the mass, a distance between the first piezoelectric layer and the side surface being gradually increases.

8. An apparatus for providing haptic feedback, comprising:
   a main board defining a mounting surface;
   a vibration unit mounted on the mounting surface of the main board, the vibration unit being capable of vibrating along a direction parallel to the mounting surface and defining at least two fastening portions at two distal ends thereof;
   at least two screws fixing the vibration unit on the main board through the fastening portions along a direction perpendicular to the vibrating direction of the vibration unit;
   wherein the vibration unit further comprises a substrate defining a main body, a first piezoelectric layer attached to one side of the main body, and a mass attached to the first piezoelectric layer, each of the main body of the substrate, the piezoelectric layer, and the mass being substantially perpendicular to the vibrating direction of the vibration unit; and wherein
   the substrate further comprises a wing extending perpendicularly from the main body, and the mass further defines a notch for at least partially receiving the wing.

9. The apparatus for providing haptic feedback as described in claim 8 further comprising a second piezoelectric layer attached to another side of the main body of the substrate.

10. The apparatus for providing haptic feedback as described in claim 8, wherein the fastening portion of the vibration unit extends from the main body of the substrate, and further defines a pair of positioning portions both perpendicular to the main body of the substrate, and an extending portion connecting the positioning portions, each of the positioning portions being provided with a substrate hole for cooperating with the screw.

11. The apparatus for providing haptic feedback as described in claim 10 further comprising a supporting block received in the slot of the fastening portion and defining a through hole for cooperating with the screw.

12. The apparatus for providing haptic feedback as described in claim 11, wherein the supporting block further defines a recess for at least partially receiving the positioning portion of the fastening portion.

13. The apparatus for providing haptic feedback as described in claim 8, wherein the main board further comprises a protrusion with a board hole therein for cooperating with the screw and for keeping the vibration unit a distance from the mounting surface of the main board.

14. The apparatus for providing haptic feedback as described in claim 8, wherein the mass defines a side surface adjacent to the first piezoelectric layer, the mass connects to the first piezoelectric layer with a middle portion of the side surface attached to the side of the first piezoelectric layer.

* * * * *